United States Patent
Chen et al.

(10) Patent No.: US 10,409,615 B2
(45) Date of Patent: Sep. 10, 2019

(54) CONFIGURABLE ARITHMETIC UNIT

(71) Applicant: The Regents of the University of Michigan, Ann Arbor, MI (US)

(72) Inventors: Yajing Chen, Ann Arbor, MI (US); Trevor Mudge, Ann Arbor, MI (US); Ronald Dreslinski, Jr., Ann Arbor, MI (US); Shengshuo Lu, Ann Arbor, MI (US); Hun Seok Kim, Ann Arbor, MI (US); David Theodore Blaauw, Ann Arbor, MI (US); Fu Cheng, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/626,335

(22) Filed: Jun. 19, 2017

(65) Prior Publication Data
US 2018/0365021 A1  Dec. 20, 2018

(51) Int. Cl.
| | |
|---|---|
| G06F 7/72 | (2006.01) |
| G06F 15/78 | (2006.01) |
| G06F 9/38 | (2018.01) |
| H04L 9/06 | (2006.01) |
| G06F 7/57 | (2006.01) |

(52) U.S. Cl.
CPC ............ *G06F 9/3897* (2013.01); *G06F 7/57* (2013.01); *G06F 7/724* (2013.01); *G06F 7/727* (2013.01); *G06F 15/7867* (2013.01); *H04L 9/0631* (2013.01); *G06F 7/725* (2013.01)

(58) Field of Classification Search
CPC .................................. G06F 7/724; G06F 7/726
See application file for complete search history.

(56) References Cited

U.S. PATENT DOCUMENTS

| | | | |
|---|---|---|---|
| 6,766,345 B2 | 7/2004 | Stein et al. | |
| 7,177,891 B2 | 2/2007 | Stein et al. | |
| 8,392,806 B2 | 3/2013 | Kim et al. | |
| 9,934,841 B1* | 4/2018 | Langhammer | ....... H05K 999/99 |
| 2003/0141898 A1* | 7/2003 | Langhammer | ........ G06F 7/5095 |
| | | | 326/40 |
| 2010/0306299 A1* | 12/2010 | Reidenbach | ............ G06F 7/726 |
| | | | 708/492 |

OTHER PUBLICATIONS

Targhetta, et. al. "Energy-Efficient Implementations of GF(p) and GF(2m) Elliptic Curve Cryptography", Conference: Proposed for presentation at the The 33rd IEEE International Conference on Computer Design held Oct. 18-Aug. 21, 2015 in New York City, New York, 8 pgs.

(Continued)

*Primary Examiner* — Chuong D Ngo
(74) *Attorney, Agent, or Firm* — Berkeley Law & Technology Group, LLP

(57) ABSTRACT

Subject matter disclosed herein may relate to arithmetic units of processors, and may relate more particularly to configurable arithmetic units. Configurable arithmetic units may comprise a plurality of basic units, and may further comprise a programmable fabric to selectively connect the plurality of basic units at least in part to process one or more sets of parameters in accordance with one or more specified arithmetic operations.

19 Claims, 10 Drawing Sheets

(56) References Cited

OTHER PUBLICATIONS

Notification of Transmittal of the International Search Report and the Written Opinion of the International Searching Authority, or the Declaration, International Application No. PCT/GB2018/051686, dated Sep. 11, 2018, 1 pg.

International Search Report, International Application No. PCT/GB2018/051686, dated Sep. 11, 2018, 5 pgs.

Written Opinion of the International Searching Authority, International Application No. PCT/GB2018/051686, dated Sep. 11, 2018, 9 pgs.

Sandoval-Ruiz, et. al., "RS encoder (255, k) in reconfigurable hardware oriented cognitive radio" Article in Ingenieria y Universidad 17(1):77-91—Jan. 2013, 13 pgs.

Ibrahim, et. al., "Low Power Semi-systolic Architectures for Polynomial-Basis Multiplication over GF(2m) Using Progressive Multiplier Reduction", Ibrahim, A. & Gebali, F. J Sign Process Syst (2016) 82: 331. https://doi.org/10.1007/s11265-015-1000-x, 13 pgs.

Jeon, et. al., "An Energy Efficient Full-Frame Feature Extraction Accelerator With Shift-Latch FIFO in 28 nm CMOS", IEEE Journal of Solid-State Circuits, vol. 49, No. 5, May 2014, 14 pgs.

Atieno, et. al., "An Adaptive Reed-Solomon Errors-and-Erasures Decoder", University of Massachusetts, FPGA '06, Feb. 22-24, 2006, Monterey, California, USA, 9 pgs.

Hutter M., Feldhofer M., Wolkerstorfer J. (2011) "A Cryptographic Processor for Low-Resource Devices: Canning ECDSA and AES Like Sardines", In: Ardagna C.A., Zhou J. (eds) Information Security Theory and Practice. Security and Privacy of Mobile Devices in Wireless Communication. WISTP 2011. Lecture Notes in Computer Science, vol. 6633. Springer, Berlin, Heidelberg, 16 pgs.

Sayilar, et. al., "Cryptoraptor: High Throughput Reconfigurable Cryptographic Processor", 2014 IEEE/ACM International Conference on Computer-Aided Design (ICCAD), Nov. 2-6, 2014, 8 pgs.

Pan, et. al., "Low-Latency Digit-Serial and Digit-Parallel Systolic Multipliers for Large Binary Extension Fields", IEEE Transactions on Circuits and Systems—I: Regular Papers, vol. 60, No. 12, Dec. 2013, 10 pgs.

Canright, "A Very Compact S-Box for AES", In: Rao J.R., Sunar B. (eds) Cryptographic Hardware and Embedded Systems—CHES 2005. CHES 2005. Lecture Notes in Computer Science, vol. 3659. Springer, Berlin, Heidelberg, 15 pgs.

Clercq, "Ultra Low-Power implementation of ECC on the ARM Cortex-M0+", 2014 51st ACM/EDAC/IEEE Design Automation Conference (DAC), Jun. 1-5, 2014, 8 pgs.

Erdem, "Fast software multiplication in F2[x] for embedded processors", Turk J Elec Eng & Comp Sci, vol. 20, No. 4, 2012, 13 pgs.

Mathew, et. al., "Hardware Implementation of (63, 51) BCH Encoder and Decoder for WBAN Using LFSR and BMA", International Journal on Information Theory (IJIT), vol. 3, No. 3, Jul. 2014, 11 pgs.

Lopez, "Improved Algorithms for Elliptic Curve Arithmetic in GF(2n)", Selected areas in cryptography. 5th annual nternational workshop, SAC '98. Kingston, Ontario, Canada, Aug. 17-18, 1998. Proceedings (pp. 201-212), 12 pgs.

Luo, "Efficient Software Implementations of Large Finite Fields GF(2n) for Secure Storage Applications", ACM Transactions on Storage, vol. V, No. N, pp. 1-29, 32 pgs., 2012.

Mozhiarasi, et. al., "An Enhanced (31,11,5) Binary BCH Encoder and Decoder for DataTransmission", International Journal of Engineering Research and General Science vol. 3, Issue 2, Part 2, Mar.-Apr. 2015, ISSN 2091-2730, 5 pgs.

\* cited by examiner

CONFIGURABLE ARITHMETIC UNIT

BACKGROUND

Field

Subject matter disclosed herein may relate to arithmetic units of processors, and may relate more particularly to configurable arithmetic units.

Information

Integrated circuit devices, such as processor, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may communicate with other mobile devices and/or computing devices via a communication channel and/or a communication path, such as comprising a portion of the Internet and/or the Web one or more networks, such as the Internet, for example. A mobile device, for example, may include integrated circuit devices, such as processors, to facilitate communication with other mobile devices and/or computing devices.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
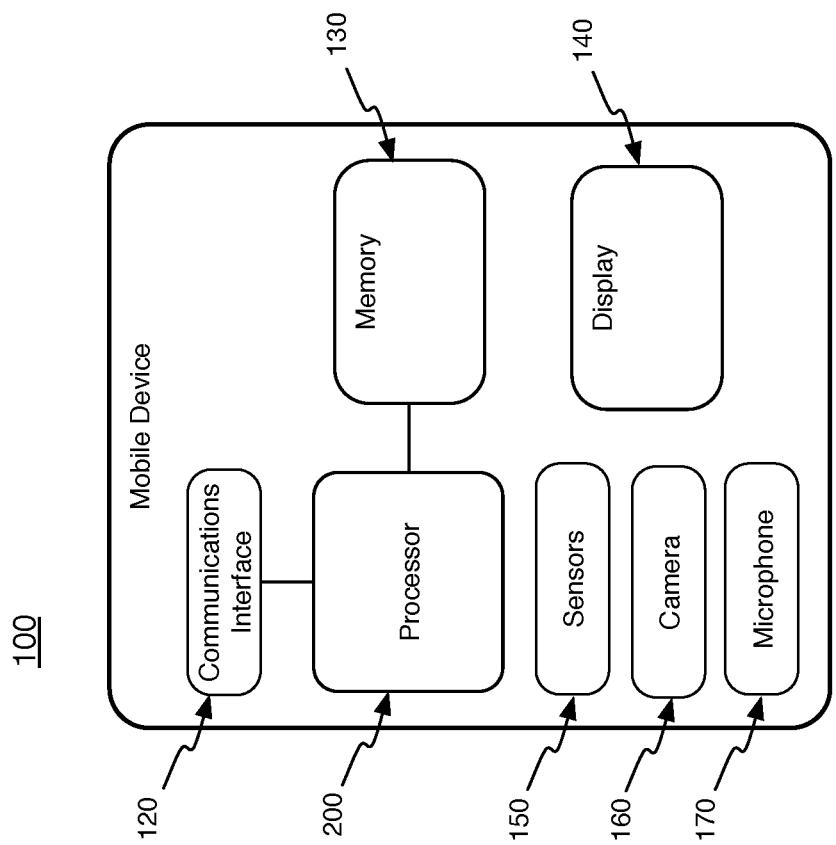
FIG. 1 is an illustration of an example mobile device, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processor, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may communicate with other mobile devices and/or computing devices via a communication channel and/or a communication path, such as comprising a portion of the Internet and/or the Web one or more networks, such as the Internet, for example, as discussed more fully below. A mobile device, for example, may include integrated circuit devices, such as processors, to facilitate communication with other mobile devices and/or computing devices. For example, mobile devices may include one or more processors to process signals and/or states in accordance with one or more communications standards and/or protocols, as also discussed more fully below.

In one or more embodiments, communication between computing devices, such as between mobile devices and/or between mobile devices and other computing devices, may include error correction and/or cryptography to promote reliable and/or secure communications, for example. For example, as discussed below, computing devices, such as mobile devices, may communicate over a network and/or sub-network via signal packets and/or signal frames that may be substantially compliant and/or substantially compatible with one or more network protocol stacks. In an embodiment, such network protocol stacks may specify one or more error correction coding protocols and/or one or more cryptographic protocols, for example. For example, binary Bose-Chaudhuri-Hocquenghem (BCH) coding and/or Reed Solomon (RS) coding may be employed as error correction techniques. Also, for example, cryptographic techniques substantially compliant with and/or substantially compatible with an Elliptic Curve Cryptography-type protocol and/or the Advanced Encryption Standard (AES) (Federal Information Processing Standards Publication 197, United States National Institute of Standards and Technology (NIST), Nov. 26, 2001), may be employed, in an embodiment. However, claimed subject matter is not limited in scope in these respects.

In an embodiment, one or more error correction coding protocols and/or one or more cryptographic protocols may utilize one or more relatively larger sets of parameters representative of one or more finite fields, such as Galois fields, as part of a coding scheme. As utilized herein, the terms "finite field" and/or "Galois field" refer to a set of parameters that includes a finite number of elements. The term "parameter" may be utilized herein interchangeably and/or synonymously with the terms "bits," "values," "elements," "symbols," "characters," "terms," "numbers," "numerals," "measurements," "content" and/or the like. As also mentioned below, all of these and/or similar terms are to be associated with appropriate physical quantities and are merely convenient labels. In an embodiment, a Galois field, for example, may comprise a finite set of parameters on which various operations, such as multiplication, addition, subtraction, and/or division, for example, may be performed. For some embodiments, error correction coding protocols and/or cryptographic protocols may utilize relatively large Galois fields. For example, an Elliptic Curve Cryptography-type protocol may utilize a Galois field having $2^{233}$ parameters, in an embodiment, although claimed subject matter is not limited in scope in this respect. In some circumstances, error correction coding protocols and/or cryptographic protocols may be relatively computationally expensive due at least in part to the involvement of such relatively larger sets of parameters, such as sets of parameters representative of relatively larger Galois fields.

In some circumstances, general purpose processors may be utilized to implement error correction and/or cryptographic protocols related to network communication for a computing device. In other circumstances, hardware accelerators dedicated to specific error correction and/or cryptographic protocols may be utilized. A potential advantage of utilizing general purpose processors for error correction and/or cryptography may include coding flexibility. That is, a general purpose processor may execute instructions for a wide range of error correction and/or cryptographic protocols. However, due at least in part to the relatively computationally expensive nature of error correction and/or cryptography related to network communication, such as may be due to computations involving relatively larger sets of parameters, utilization of general purpose processors for these tasks may be relatively inefficient. For example, the energy efficiency of a general purpose processor may be significantly worse than that for dedicated hardware accelerators for error correction and/or cryptographic processing. On the other hand, hardware accelerators dedicated to specific error correction and/or cryptographic protocols may lack the coding flexibility of a general purpose processor, and/or may be relatively expensive in terms of development efforts and/or production costs (e.g., increased integrated circuit die area, particularly when implementing dedicated accelerators for multiple protocols). To address these challenges, example embodiments herein describe hardware arithmetic units that may provide coding flexibility as well as integrated circuit die area efficiency and/or energy efficiency, for example.

FIG. 1 is an illustration of an embodiment 100 of an example mobile device, in accordance with an embodiment. In an embodiment, a mobile device, such as 100, may comprise one or more processors, such as processor 200, and/or may comprise one or more communications interfaces, such as communications interface 120. In an embodiment, one or more communications interfaces, such as communications interface 120, may enable wireless communications between a mobile device, such as mobile device 100, and one or more other computing devices. In an embodiment, wireless communications may occur substantially in accordance any of a wide range of communication protocols, such as those mentioned herein, for example.

In an embodiment, a mobile device, such as mobile device 100, may include a memory, such as memory 130. In an embodiment, memory 130 may comprise a non-volatile memory, for example. Further, in an embodiment, a memory, such as memory 130, may have stored therein executable instructions, such as for one or more operating systems, communications protocols, and/or applications, for example. Further, in an embodiment, a mobile device, such as mobile device 100, may comprise a display, such as display 140, one or more sensors, such as one or more sensors 150, one or more cameras, such as one or more cameras 160, and/or one or more microphones, such as microphone 170, for example. In an embodiment, one or more sensors, such as 150, may comprise one or more accelerometers, gyroscopes, thermometers, magnetometers, barometers, light sensors, or proximity sensors, or a combination thereof. Of course, these are merely example types of components that may be included in a mobile device, and claimed subject matter is not limited in scope to these particular examples.

As mentioned above, to address potential challenges with respect to efficiency, costs, and/or coding flexibility related to aspects of network communication, such as error correction and/or cryptography, for example, a processor, such as processor 200, may include an embodiment of a hardware arithmetic unit that may provide coding flexibility as well as integrated circuit die area efficiency and/or energy efficiency, for example. An example embodiment is described below in connection with FIG. 2.

Figure 2:
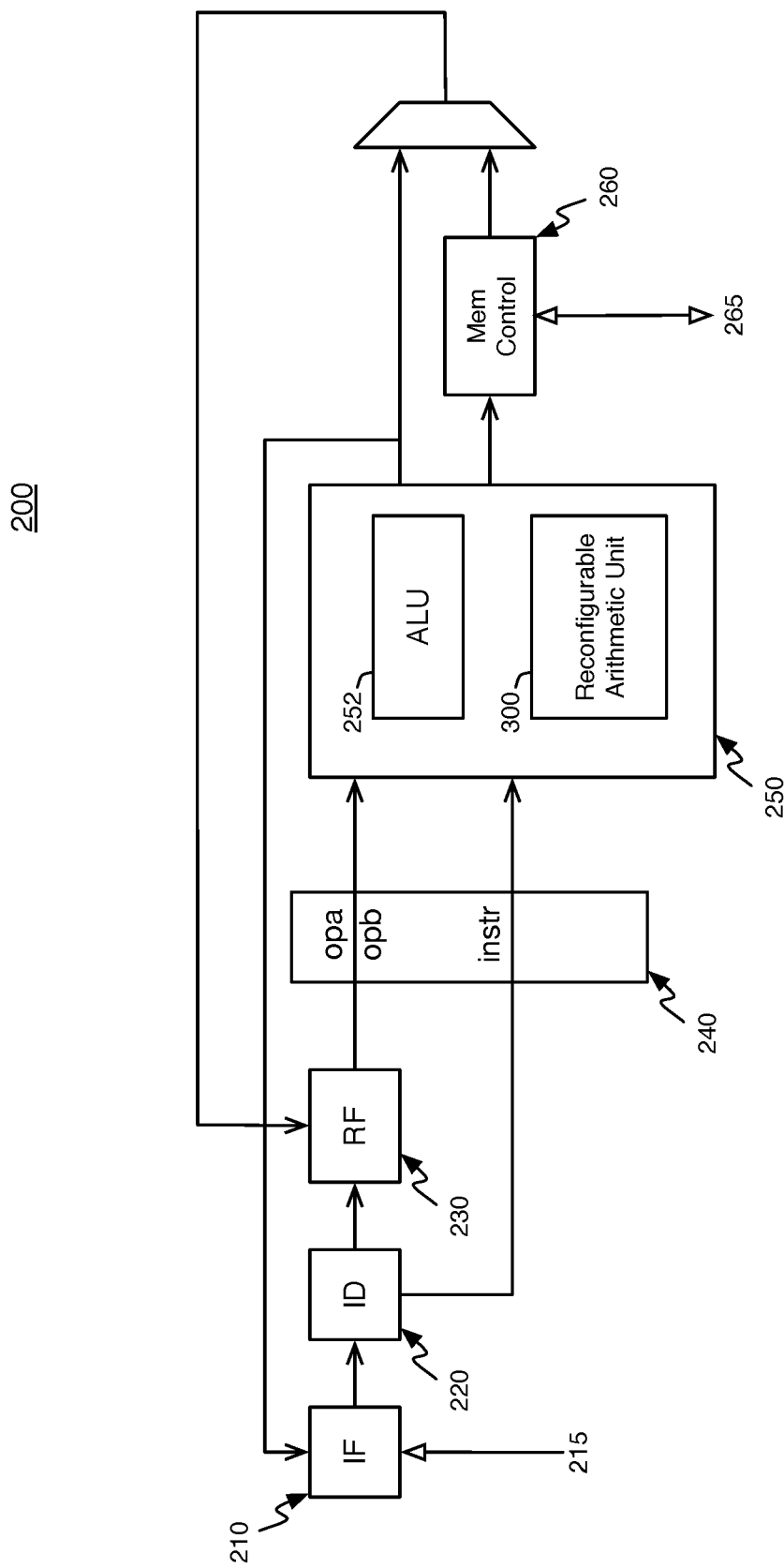
FIG. 2 is a schematic block diagram depicting an example processor, in accordance with an embodiment.

FIG. 2 is a schematic block diagram depicting an embodiment 200 of an example processor. In an embodiment, processor 200 may include an instruction fetch unit (IF), such as instruction fetch unit 210, and/or an instruction decode unit (ID), such as instruction decode unit 220. In an embodiment, an instruction fetch unit, such as IF 210, may obtain executable instructions, such as executable instructions 215, from a memory, such as memory 130. Also, in an embodiment, an instruction decode unit, such as ID 220, may obtain executable instructions from an instruction fetch unit, such as IF 210, and may decode the instructions. In an embodiment, decoded instructions may be communicated between an instruction decode unit, such as ID 220, and a register file, such as RF 230, and/or a pipeline register, such as pipeline register 240. In an embodiment, a register file, such as RF 230, may comprise a 16 entry 32-bit register file, for example. Also, in an embodiment, a processor, such as processor 200, may implement a 32 bit data path, although claimed subject matter is not limited in scope in this respect.

In an embodiment, an instruction execution unit, such as instruction execution unit 250, may obtain a decoded instruction and/or one or more operands from a pipeline register, such as pipeline register 240. In an embodiment, single instruction, multiple data (SIMD) instructions may be supported. In an embodiment, SIMD instructions having two operands may be executable, although other embodiments may support SIMD instructions having different numbers of operands. For example processor 200, an instruction execution unit, such as instruction execution unit 250, may obtain two operands, such as operand "a" and operand "b" from a pipeline register, such as pipeline register 240.

In an embodiment, an instruction execution unit, such as instruction execution unit 250, may include a general purpose arithmetic logic unit (ALU), such as ALU 252. Also, in an embodiment, an instruction execution unit, such as instruction execution unit 250, may include an arithmetic unit, such as configurable arithmetic unit 300, dedicated to processing sets of parameters, such as parameter sets representative of Galois fields. In an embodiment, SIMD instructions for processing sets of parameters representative of Galois fields, for example, may include instructions to perform multiplication operations, square/power operations, multiplicative inverse operations, and/or partial product operations, to list several examples. As discussed more fully below, a configurable arithmetic unit, such as 300, may provide coding flexibility as well as integrated circuit die area efficiency and/or energy efficiency, for example.

In an embodiment, a processor, such as processor 200, may further comprise a memory controller unit, such as memory controller unit 260, by which parameters may be communicated between a processor, such as processor 200, and a memory, such as memory 130, for example. In an embodiment, results from an execution unit, such as instruction execution unit 250, may be stored in a memory by way of a memory controller unit, such as memory controller unit 260, and/or may be communicated to a register file, such as RF 230.

In an embodiment, control-related computation, integer arithmetic operations, and/or memory operations, for example, may be performed by general purpose functional units, such as units 210, 220, 230, 240, 252, and 260, for example. Operations on relatively larger sets of parameters, such as sets of parameters representative of Galois fields, for example, may be performed by a dedicated unit, such as configurable arithmetic unit 300, as described more fully below.

In an embodiment, a configurable arithmetic unit, such as configurable arithmetic unit 300, may provide relatively efficient support for a very broad range of applications including, for example, asymmetric cryptography (e.g. Elliptic Curve Cryptography), symmetric cryptography (e.g. AES), parameterized error correction codes for different error patterns (e.g. RS for burst errors, BCH for uniformly distributed random errors), and so on. Utilization of a configurable arithmetic unit, such as configurable arithmetic unit 300, dedicated, for example, to operations on sets of parameters, such as parameters representative of Galois fields, may be relatively much more efficient than software solutions executed on general purpose processors. For example, to provide similar throughput, a general-purpose processor may run at a relatively high clock rate and/or work rate, thereby consuming increased energy and in some situations resulting in infeasibility from an energy constraint perspective. Additionally, computing devices with constrained resources, such as may be the case with mobile devices, for example, may benefit from increased efficiency provided by a configurable arithmetic unit, such as configurable arithmetic unit 300, that may be dedicated to operations on sets of parameters, such as parameters representative of Galois fields. Additionally, as compared to application specific integrated circuits (ASIC), a configurable arithmetic unit dedicated to operations on sets of parameters, such as parameters representative of Galois fields, may be more flexible, in that embodiments in accordance with claimed subject matter may implement bit-width flexibility and/or may incorporate arbitrary irreducible polynomials, such as may be associated with particular Galois fields, for example. Additionally, a configurable arithmetic unit in accordance with claimed subject matter may be more integrated circuit area efficient as compared to solutions employing multiple ASICs.

Figure 3:
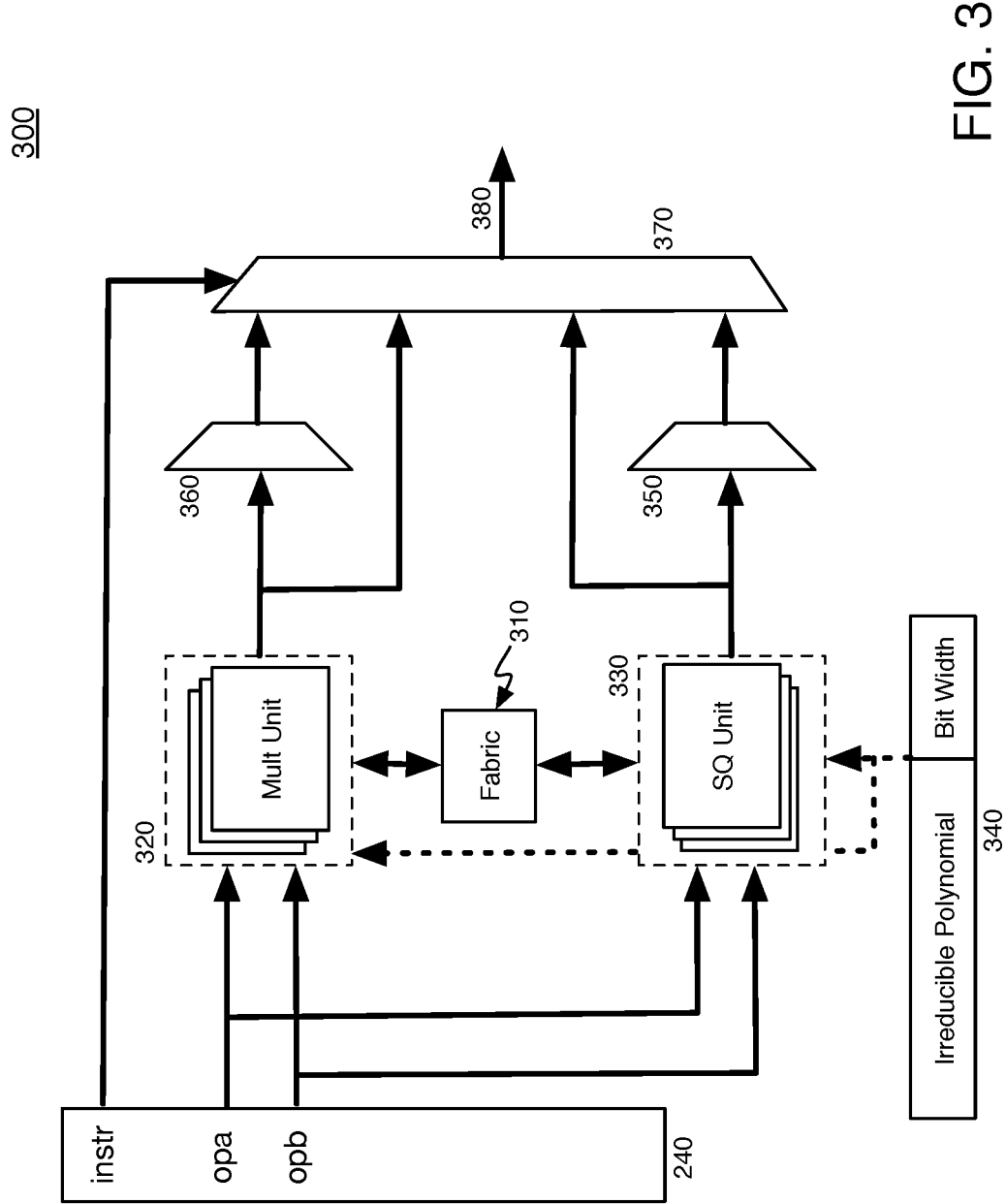
FIG. 3 is a schematic block diagram of an example configurable arithmetic unit, in accordance with an embodiment.

FIG. 3 is a schematic block diagram of an embodiment 300 of an example configurable arithmetic unit. In an embodiment, a configurable arithmetic unit, such as 300, may process sets of parameters representative of binary Galois fields ($2^m$) where m represents a bit width to represent a parameter in a Galois field. In an embodiment, m-bit inputs may result in m-bit outputs, for example. Also, in an embodiment, m may be less than or equal to 8, although claimed subject matter is not limited in scope in this respect. For example, embodiments with bit-widths in the range of 5-8 may be implemented.

In an embodiment, a configurable arithmetic unit, such as configurable arithmetic unit 300, may include multiple multiplication units, such as multiplication units (Mutt) 320, and may also include multiple squaring/power units, such as squaring units (SQ) 330. In an embodiment, sixteen multiplication units, such as Mult 320, may be included, and twenty-eight squaring/power units, such as SQ 330, may be included, although claimed subject matter is not limited in scope to the particular example configurations described herein.

Figure 4:
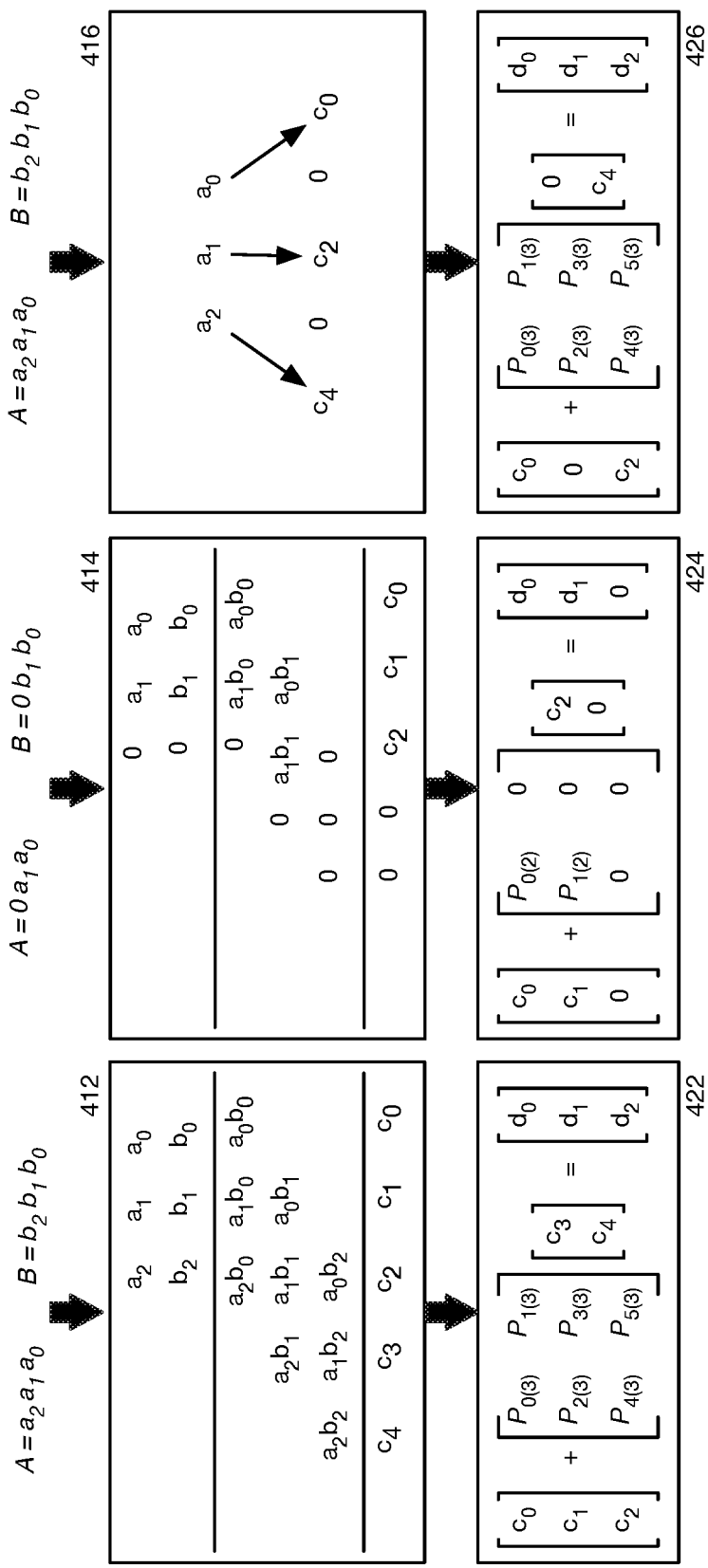
FIG. 4 is an illustration of example arithmetic operations, in accordance with an embodiment.

In an embodiment, multiplication units, such as Mult 320, and/or squaring/power units, such as SQ 330, may comprise "primitive" or "basic" units. As utilized herein, the terms "basic unit" and/or "primitive unit" refer to execution units that may be combined with other basic and/or primitive units to perform larger operations. For example, multiplicative inverse, partial product, and/or SIMD instructions, to name a few examples, may be accomplished at least in part by combining multiple multiplication and/or squaring/power basic units, as described more fully below. In an embodiment, basic units, such as Mult 320 and/or SQ 330, may perform up to 8-bit operations, although, as mentioned, claimed subject matter is not limited in scope in this respect. As discussed below, and as depicted in FIG. 4, 2-bit and/or 3-bit operations for basic units may be supported in individual basic units, in an embodiment.

Figure 5:
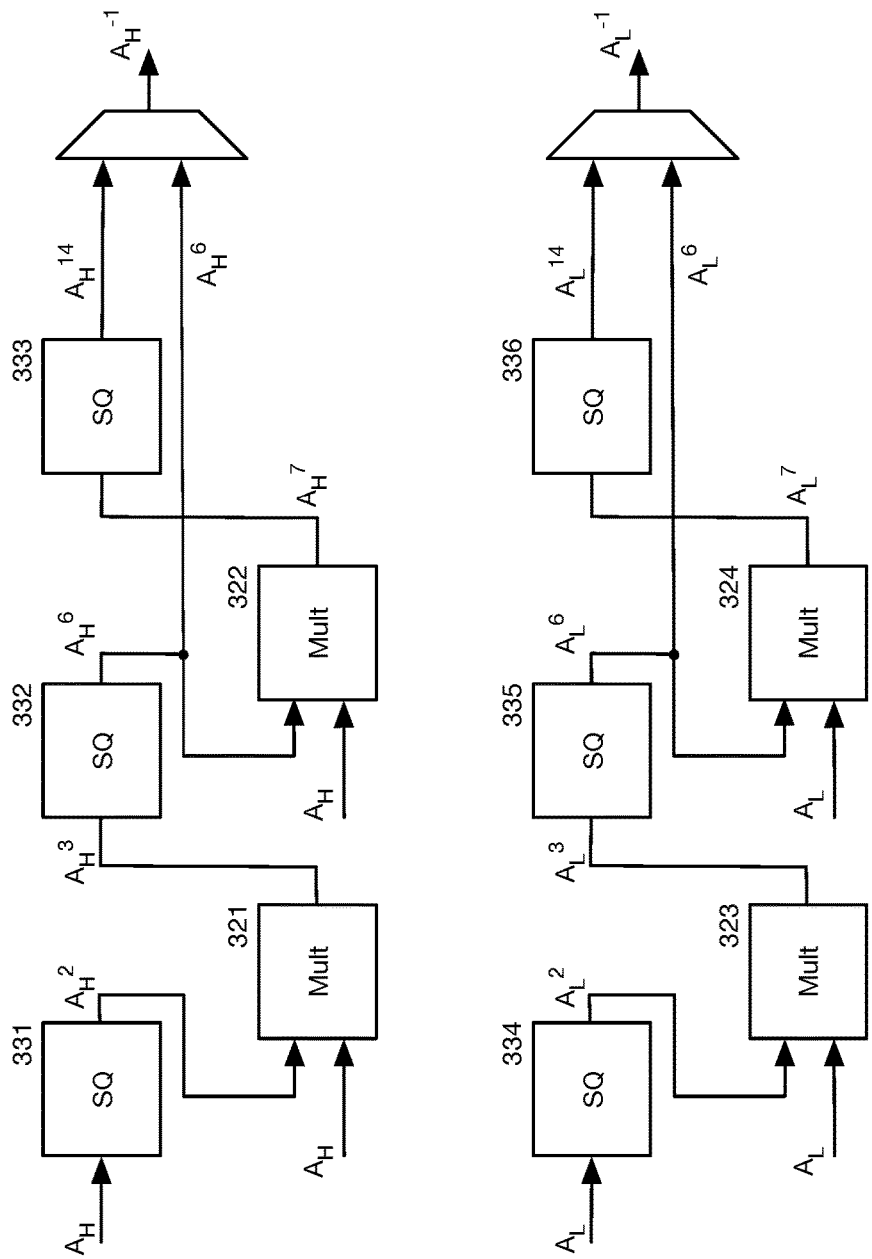
FIG. 5 is a schematic block diagram depicting an example configuration of a configurable arithmetic unit, in accordance with an embodiment.
Figure 7:
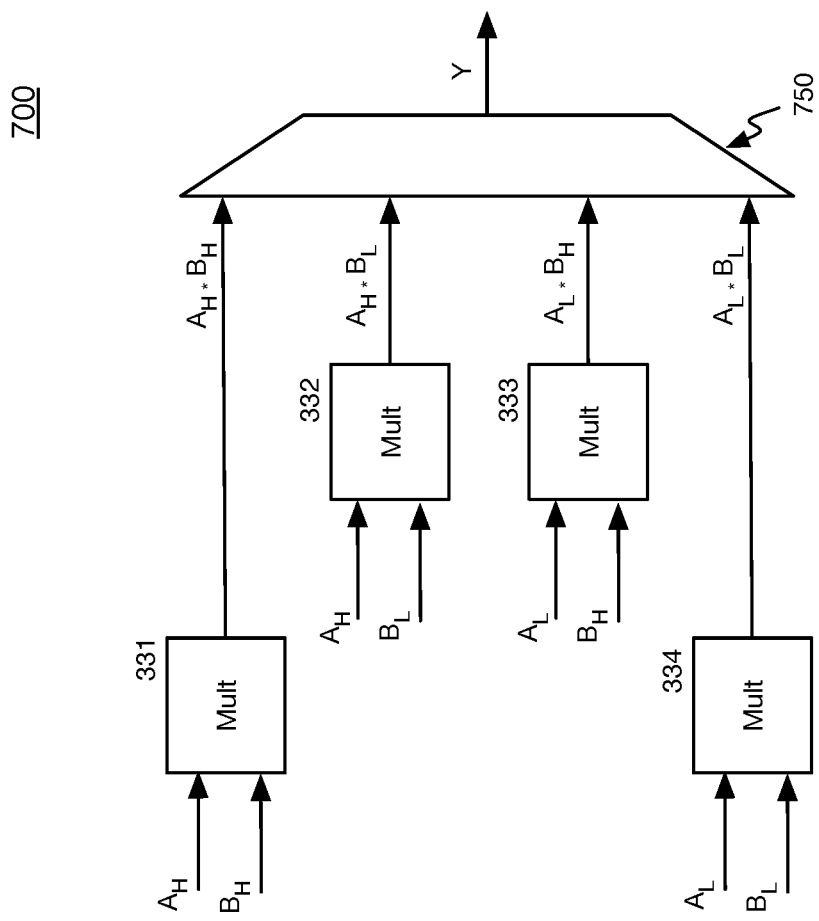
FIG. 7 is a schematic block diagram depicting an example configuration of a configurable arithmetic unit, in accordance with an embodiment.

To perform various specified operations in accordance with different executable instructions, programmable control logic, such as a configuration register 340 and/or programmable fabric 310, may configure arithmetic unit, such as configurable arithmetic unit 300 to perform a specified operation, in an embodiment. For example, in an embodiment, programmable control logic, such as programmable fabric 310, may selectively connect a plurality of basic units, such as Mult 320 and/or SQ 330. For example, as discussed more fully below, multiple SQ units 330 may be selectively connected in a manner to perform a SIMD squaring/power operation. For example, six SQ units 330 may be selectively connected to perform a SIMD squaring/power operation, in an embodiment, although claimed subject matter is not limited in scope in this respect. See, for example, FIG. 8. Also, for example, multiple squaring/power units, such as SQ 330, may be selectively connected with multiple multiplication units, such as Mult 320, to perform a multiplicative inverse operation, in an embodiment, such as depicted in FIG. 5. Additionally, for example, a plurality of multiplication units, such as Mult 320, may be selectively connected to perform a partial product operation, such as depicted in FIG. 7, in an embodiment. Such example operations are discussed more fully below.

As utilized herein, the term "fabric" refers to one or more electrically conductive paths interconnecting one or more functional units. Also, as utilized herein, the terms "programmable fabric" and/or "configurable fabric" refer to one or more electrically conductive paths interconnecting a selectable combination of functional units, wherein different combinations of functional units may be selected at different points in time. In an embodiment, a programmable fabric may be implemented, for example, utilizing a plurality of electrically conductive lines and/or utilizing one or more switching devices, such as one or more transistors. Also, in an embodiment, a programmable fabric, such as 310, may selectively connect various basic units, such as one or more Mult units 320 and/or one or more SQ units 330, based at least in part on an executable instruction and/or based at least in part on contents of a configuration register, such as configuration register 340. Example selective connections of basic units are depicted in FIGS. 5-8, although claimed subject matter is not limited in scope to the particular examples provided.

In an embodiment, a configuration register, such as configuration register 340, may include storage for a parameter representative of a bit width associated with operations to perform a particular executable instruction. Also, in an embodiment, a configuration register, such as configuration register 340, may be programmable with parameters representative of a polynomial associated with a particular Galois field. In an embodiment, such a polynomial may comprise an arbitrary irreducible polynomial associated with a Galois field. For example, as different sets of parameters representative of different Galois fields are processed, parameters representative of different irreducible polynomials may be programmed into configuration register 340, in an embodiment. Also, in an embodiment, a configuration register, such as 340, may comprise a centralized configuration register that may be shared among multiple arithmetic units for embodiments incorporating multiple configurable arithmetic units, thus spreading out the overhead burden. Additionally, a configuration register, such as configuration register 340, may be used to gate (i.e., shut off) portions of circuitry not being used for particular operations, thereby reducing power consumption, as discussed more fully below.

In an embodiment, an example configurable arithmetic unit, such as configurable arithmetic unit 300, may include an XOR accumulation unit, such as XOR accumulation unit 360, and/or may also include a power selection unit, such as power selection unit 350. Further, in an embodiment, an example configurable arithmetic unit, such as configurable arithmetic unit 300, may include a multiplexer, such as multiplexer 370. In an embodiment, an XOR accumulation unit, such as 360, a power selection unit, such as 350, and/or a multiplexer unit, such as 370, may combine outputs of one or more multiplication units, such as Mult units 320, and/or one or more squaring/power units, such as SQ units 330, to produce a result, such as 380.

In an embodiment, a configurable arithmetic unit, such as configurable arithmetic unit 300, and such as may be dedicated to operations related to sets of parameters representative of Galois fields, may comprise a basic building block that may be integrated into processors, such as embedded processors (e.g., Cortex M class processors from ARM, LTD.), as a hardware accelerator to provide flexible and/or efficient Galois field computations. A general-purpose processor with one or more configurable arithmetic units, such as configurable arithmetic unit 300, and such as may be dedicated to Galois field operations, may not lose any generality, and may provide relatively efficient support for relatively highly utilized Galois technologies and/or protocols incorporating Galois field operations, such as, for example, technologies and/or protocols involving small bit-width (5-8 bit) with arbitrary polynomials, covering various error correction codes and/or AES, and such as technologies and/or protocols involving large bit-width (>100 bit) with sparse polynomials, such as standard elliptic curve cryptography, for example. Again, claimed subject matter is not limited in scope to the particular examples provided herein.

FIG. 4 is an illustration of example arithmetic operations, in accordance with an embodiment. For the example operations depicted in FIG. 4, a configurable arithmetic unit, such as configuration arithmetic unit 300, may perform operations in accordance with one or more SIMD-type executable instructions. Further, example operations depicted in FIG. 4 may be accomplished via individual basic units, such as an individual multiplication unit 320 and/or an individual squaring/power unit 330.

In an embodiment, a multiplication unit, such as a Mult unit 320, may perform multiplication operations that may be partitioned into a carryless multiplication operation, such as depicted at block 412, and a polynomial reduction module, such as depicted at block 422. In an embodiment, a multiplication unit, such as Mult 320, may compute a (2m-1) bit product from two m-bit inputs, as depicted, for example, at block 412. For the particular example depicted at block 412, two 3-bit inputs A and B may be multiplied using a carryless multiplication operation. Additionally, in an embodiment, a polynomial reduction operation, such as depicted at block 422, may perform modulo(c, r), wherein c represents a carryless multiplier output, such as the output of block 412, and wherein r comprises a vector representation of an irreducible polynomial. In an embodiment, a polynomial reduction module, such as 422, may be implemented as a linear transformation at least in part by incorporating two-parameter Galois field vector multiplication. In an embodiment, a polynomial reduction operation may be accomplished utilizing a reduction matrix P. Also, in an embodiment, P may be derived from a transformation of an irreducible polynomial (r→P), which may be derived a priori, for example, although claimed subject matter is not limited in scope in these respects. In an embodiment, to program a polynomial reduction module, parameters representative of P may be written to a configuration register, such as 340, for example.

In an embodiment, an output product c from a multiplication operation, such as 412, may be mapped to a polynomial reduction module, such as 422, at least in part by partitioning the full product c into a reduction vector, represented by $[c_4, c_3]$ for this particular example, and into a remainder vector, represented by $[c_2, c_1, c_0]$ for this particular example. Further, for the example depicted in polynomial reduction module 422, an output vector [d2, d1, d0] may represent a bit-reduced output of the example multiplication operation of block 412, in an embodiment. It may be noted that the output vector d has an identical bit-width as the input parameters A and B, in an embodiment.

For the example operations depicted in FIG. 4, block 414 may represent a multiplication operation on a smaller bit-width, as compared with block 412. For example, block 414 depicts a 2-bit multiplication operation. In an embodiment, most significant bits may be set to a value "0". Also, in an embodiment, mapping of multiplication output vector c to the polynomial reduction module, depicted as block 424, may be modified as compared with the example discussed above in connection with the multiplication operation of block 412. Note that for different bit-widths, such as for different Galois field sizes, the mapping of c may be different. Also, in an embodiment, reduction matrix P may also differ depending on bit-width and/or on the particular irreducible polynomial programmed into a configuration register, such as configuration register 340. For example, a configuration register, such as 340, may specify how the mapping of partial products to the polynomial reduction module ought to occur, thereby resulting in an ability to support smaller bit-widths while reusing the same computational resources, such as in the polynomial reduction module, in an embodiment. Also, in an embodiment, control overhead to accommodate smaller bit-widths, such as 5, 6, and/or 7-bit computations, for example, may represent some 8%, approximately, of an arithmetic unit. Thus, with a relatively small increase in overhead circuitry, much greater flexibility may be achieved for embodiments in accordance with claimed subject matter.

Also depicted in FIG. 4 is an example 3-bit square operation, depicted at block 416. Again, two 3-bit input parameter vectors may be represented as A and B, for this example. As mentioned previously, and as depicted in FIG. 3, squaring/power units may comprise another basic unit type for a configurable arithmetic unit, such as configurable arithmetic unit 300. Although square/power operations may be particular cases of multiplication operations, embodiments in accordance with claimed subject matter may implement separate square/power basic units, such as SQ units 330, for example. Because a square operation may be more simple to calculate than other multiplication operation types, an SQ basic unit, such as SQ units 330, may utilize a polynomial reduction module, such as depicted at block 426, without utilizing a separate multiplication module by taking advantage of the fact that, mathematically, the full product of a square only spreads the input and inserts zeros in the odd positions, as depicted at block 416. Thus, a square operation may be accomplished utilizing only a polynomial reduction module, such as 426, in an embodiment. Additionally, in an embodiment, because square/power operations may be relatively heavily utilized in Galois field operations, it may be advantageous and/or efficient to include multiple squaring/power units, such as SQ 330, rather than rely on multiplication units, such as Mult 320, to perform squaring operations.

As mentioned, an example embodiment, such as example configurable arithmetic unit 300, may incorporate sixteen multiplication basic units, such as Mult 320, and/or may incorporate twenty-eight squaring/power basic units, such as SQ 330. In an embodiment, a four-way multiplicative inverse operations and/or a 32-bit partial product operation may utilize sixteen multiplication units, such as Mult 320, for single-cycle execution of the operations. Further, in an embodiment, twenty-eight squaring/power basic units, such as SQ 330, may be utilized to support single-cycle execution of SIMD multiplicative inverse. Of course, the scope of claimed subject matter is not limited in scope in these respects.

FIG. 5 is a schematic block diagram depicting an example configuration 500 of a configurable arithmetic unit, such as configurable arithmetic unit 300, in accordance with an embodiment. For example configuration 500, a configurable arithmetic unit, such as configurable arithmetic unit 300, may be configured to perform a multiplicative inverse operation, in an embodiment. For Galois field operation, a multiplicative inverse operation may be computed according to $\alpha^{-1} = \alpha^{2m-2}$ wherein a represents a parameter of a set of parameters representative of a Galois field. Depending at least in part on the value for m, a relatively large number of calculations may be performed to complete the specified multiplicative inverse operation. To reduce an amount of power calculations to be performed in calculating the multiplicative inverse, an algorithm, such as an Itoh-Tsujii algorithm (ITA), may be utilized, although claimed subject matter is not limited in this respect.

In an embodiment, to implement an algorithm, such as an ITA algorithm, to perform a multiplicative inverse operation, for example, a configurable arithmetic unit, such as configurable arithmetic unit 300, may be configured and/or reconfigured to selectively connect multiple multiplication basic units, such as Mult 320, and multiple squaring/power basic units, such as 330. For example configuration 500, as depicted in FIG. 5, four multiplication basic units, such as Mult 321-324, and six squaring/power basic units, such as SQ 331-SQ336, may be interconnected by way of programmable control logic, such as programmable fabric 310, to implement an multiplicative inverse operation. In an embodiment, a multiplicative inverse operation may utilize SIMD executable instructions. For example, input vectors $A_H$ and/or $A_L$ may represent SIMD operands, and values $A_H^{-1}$ and $A_H^{-1}$ may represent result parameters.

To selectively connect the various basic units, such as Mult 321-324 and SQ 331-SQ336, to configure a configurable arithmetic unit, such as configurable arithmetic unit 300, for a multiplicative inverse operation, programmable logic circuitry, such as programmable fabric 310, may electrically connect and/or couple the various basic units as depicted, for example, in FIG. 5. For example, programmable fabric 310 may electrically connect one or more electrically conductive lines between SQ 331 and Mult 321. Further, for example, programmable fabric 310 may electrically connect one or more electrically conductive lines between Mult 321 and SQ 332. Similarly, programmable fabric 310 may electrically connect electrically conductive lines between SQ 332 and Mult 322. Additional electrical connections may be made between various basic units as depicted, for example, in FIG. 5. Of course, the configuration of FIG. 5 is merely an example configuration, and claimed subject matter is not limited in scope in this respect.

Figure 6:
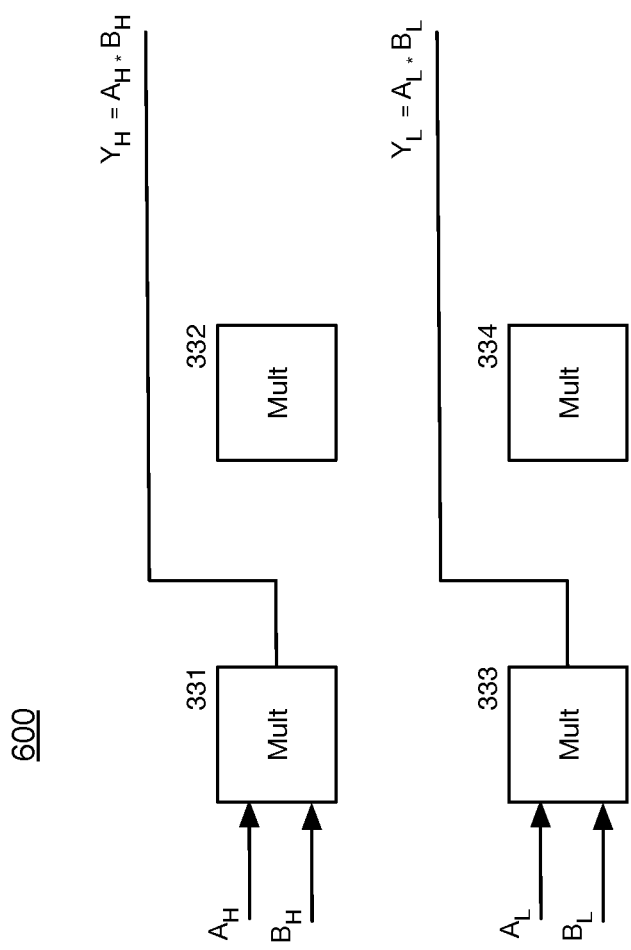
FIG. 6 is a schematic block diagram depicting an example configuration of a configurable arithmetic unit, in accordance with an embodiment.

FIG. 6 is a schematic block diagram depicting an example configuration 600 of a configurable arithmetic unit, such as configurable arithmetic unit 300, configured to perform a SIMD multiplication operation, in accordance with an embodiment. In an embodiment, input parameter vectors A and/or B may represent SIMD operands. In an embodiment, input vectors A and/or B may be partitioned into high ($A_H$, $B_H$) and low portions ($A_L$, $B_L$). Multiplication units, such as Mult 331 and 333, may perform multiplication operations, such as described above in connection with FIG. 3, for example. Also, in an embodiment, respective outputs of Mult 331 and 333 may yield output vectors $Y_H$ and $Y_L$.

In an embodiment, unused basic units, such as Mult 332 and/or 334 as depicted in FIG. 6, may be "gated." As utilized herein, the term "gated" refers to feeding input values of "0" to the inputs of the unused basic units, thereby preventing switching within the individual unused basic units. Alternatively, clock signals may be disabled to turn of unused basic units. By gating or otherwise turning off unused basic units, energy consumption may be reduced. Similarly, during periods of time when a configurable arithmetic unit, such as configurable arithmetic unit 300, is not being utilized (e.g., a processor, such as 200, is executing instructions using an ALU, such as ALU 252), the configurable arithmetic unit may be gated and/or otherwise turned off to reduce energy consumption. For example, values of "0" may be fed as default inputs to reduce switching within the configurable arithmetic unit when the configurable arithmetic unit is not in use.

FIG. 7 is a schematic block diagram depicting an example configuration 700 of a configurable arithmetic unit, such as configurable arithmetic unit 300, in accordance with an embodiment. For example configuration 700, programmable logic circuitry, such as programmable fabric 310, may selectively electrically connect multiple multiplication basic units, such as Mult 331-334, such as depicted in FIG. 7. Also, for example configuration 700, input parameter vectors A and/or B may represent SIMD operands. In an embodiment, input vectors A and/or B may be partitioned into high ($A_H$, $B_H$) and low portions($A_L$, $B_L$). In an embodiment, respective outputs from multiple multiplication basic units, such as Mult 331-334, may be combined by an XOR accumulator, such as XOR accumulation unit 750, to generate an output Y.

For example configuration 700, the various basic units, such as Mult 321-324, may be selectively connected to accommodate a 16-bit partial product operation, in an embodiment. In another embodiment, multiple multiplication basic units, such as multiple Mult units 320, may be selectively electrically connected in a manner to enable a single-cycle 32-bit partial product operation. Further, in an embodiment, relatively very wide bit-width (e.g., >100-bit) Galois field multiplication may be performed using such single-cycle 32-bit partial product operations at least in part via iterative generation of partial products and performance of reduction steps, for example.

Figure 8:
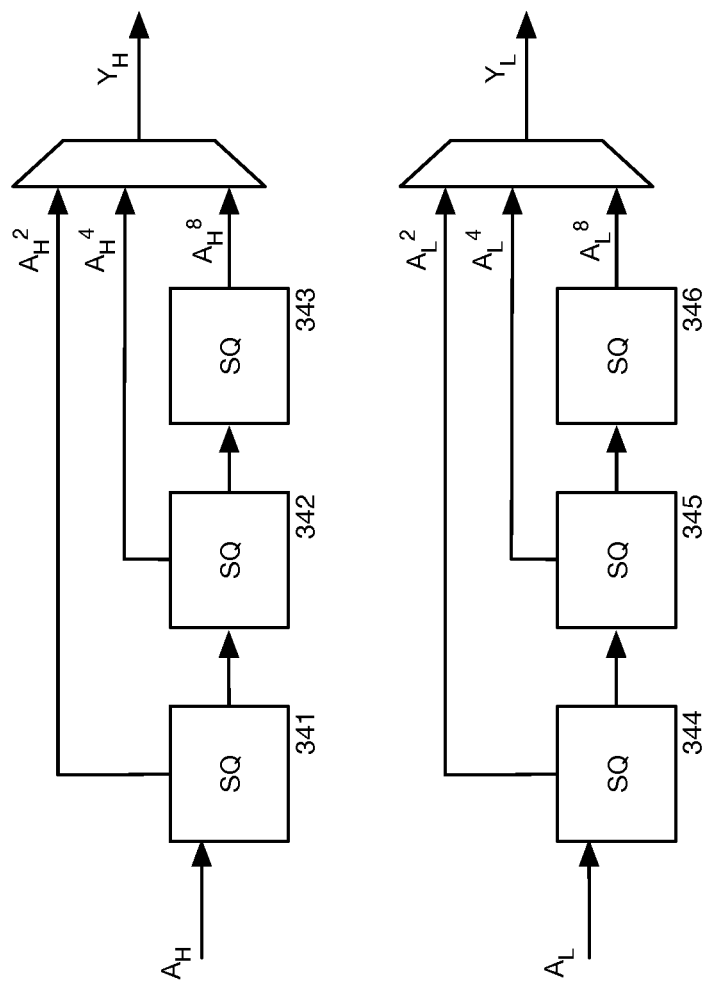
FIG. 8 is a schematic block diagram depicting an example configuration of a configurable arithmetic unit, in accordance with an embodiment.

FIG. 8 is a schematic block diagram depicting an example configuration 800 of a configurable arithmetic unit, in accordance with an embodiment. For example configuration 800, programmable logic circuitry, such as programmable fabric 310, may selectively electrically connect multiple squaring/power basic units, such as SQ 341-346, such as depicted in FIG. 8. With example configuration 800, a squaring operation may be performed, in an embodiment. In an embodiment, an input vector A may be partitioned into $A_H$ and $A_L$, for example, and respective partitions may be provided to respective groups of squaring basic units, such as groups comprising SQ 341-343 and SQ 344-346, for example. In an embodiment, contributions from SQ341-346 may be combined as depicted in FIG. 8 to generate output parameters $Y_H$ and $Y_L$, for example.

Table 1, provided below, provides a non-exhaustive listing of example operations on sets of parameters representative of Galois fields that may be performed by a configurable arithmetic unit, such as configurable arithmetic unit 300.

TABLE 1

| Format | Description | Operation |
|---|---|---|
| Category-I: SIMD Instr. Individual register files hold four 8-bit GF values, for example. All operations are in Galois field, for these examples. | | |
| gfMult_simd $R_{s1}$, $R_{s2}$, $R_d$ | Multiplication | $R_{s1} R_{s2}$ -> $R_d$ |
| gfMultInv_simd $R_s$, $R_d$ | Multiplicative Inverse | $R_s^{-1}$ -> $R_d$ |
| gfSQ_simd $R_s$, $R_d$ | Square | $R_s^2$ -> $R_d$ |
| gfPower_simd $R_{s1}$, $R_{s2}$, $R_d$ | Power | $R_{s1}^{Hs2}$ -> $R_d$ |
| gfAdd_simd $R_{s1}$, $R_{s2}$, $R_d$ | Addition | $R_{s1} R_{s2}$ > $R_d$ |
| Category-II: single cycle 32-bit Partial Product | | |
| Gf32bMult $R_{s1}$, $R_{s2}$, $R_d^h$, $R_d^l$ | 32-bit Carryfree Multiplier | $R_{s1} \times R_{s2}$ -> $R_d^h$, $R_d^l$ |
| Category-III: Configuration | | |
| gfConfig #address | Load 56-bit coef. to field config. register | *address -> $R_{config}$ |

Figure 9:
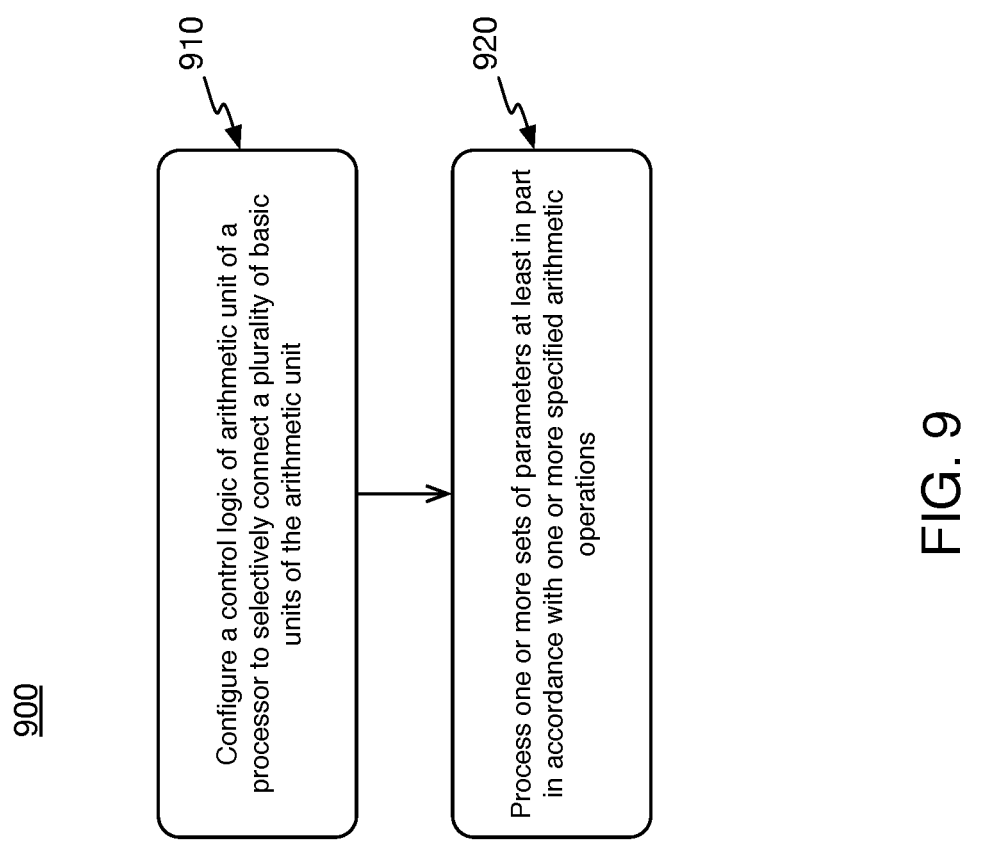
FIG. 9 is an illustration of an example process for configuring an example arithmetic unit, in accordance with an embodiment.

FIG. 9 is an illustration of an embodiment 900 of a process for configuring an example arithmetic unit. Embodiments in accordance with claimed subject matter may include all of blocks 910-920, less than blocks 910-920, or more than blocks 910-920. Also, the order of blocks 910-920 is merely an example order, and claimed subject matter is not limited in scope in these respects.

At block 910, control logic of an arithmetic unit of a processor may be configured to selectively connect a plurality of basic units of the arithmetic unit. Foe example, as described above, a configurable arithmetic unit, such as configurable arithmetic unit 300, may include a programmable fabric, such as programmable fabric 310, that may selectively interconnect various combinations of multiple basic units, such as various combinations of Mult 320 and/or SQ 330, for example. Further, in an embodiment, a configuration register, such as configuration register 340, may be programmed with parameters representative of an irreducible polynomial and/or a parameter representative of a specified bit-width, for example. In an embodiment, control logic, such as programmable fabric 310, may selectively connect various basic units, such as various combinations of Mult 320 and/or SQ 330, at least in part in accordance with one or more SIMD executable instructions and/or in accordance with parameters written to a configuration register, such as configuration register 340. Additionally, at block 920, one or more sets of parameters may be processed at least in part in accordance with one or more specified arithmetic operations. As discussed above, sets of parameters may represent Galois fields, in an embodiment, and operations performed by a configurable arithmetic unit, such as reconfiguration arithmetic unit 300, may be performed on sets of parameters representative of Galois fields.

In an embodiment, by reusing and/or reconfiguring various basic units, such as multiplication and/or squaring/power basic units, for different Galois field-related operations, such as may be specified by SIMD executable instructions, for example, improvements in performance and/or efficiency may be achieved. Increases in coding flexibility may be achieved, and relative savings in integrated circuit die area usage may also be achieved, for example, as discussed above.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 10:
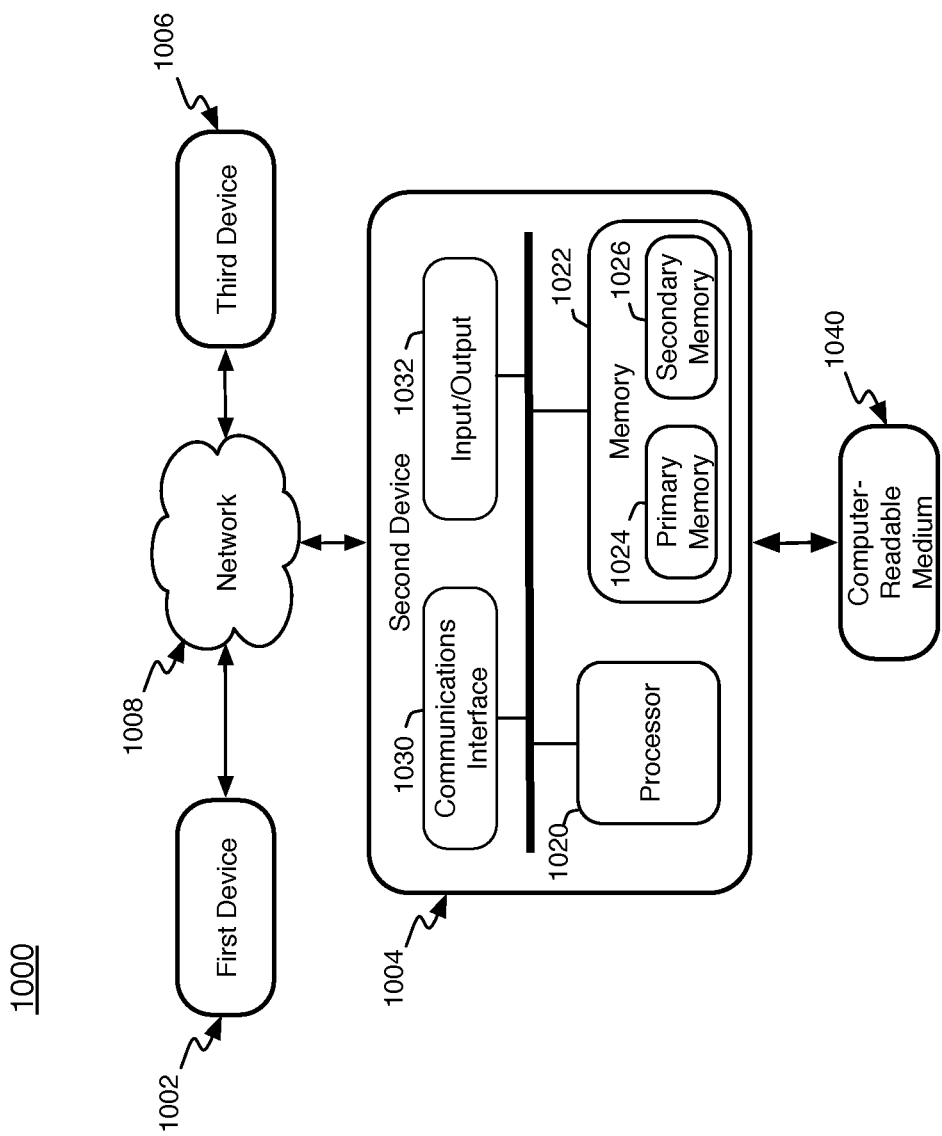
FIG. 10 is a schematic block diagram of an example computing device, in accordance with an embodiment.

In one example embodiment, as shown in FIG. 10, a system embodiment may comprise a local network (e.g., device 1004 and medium 1040) and/or another type of network, such as a computing and/or communications network. For purposes of illustration, therefore, FIG. 10 shows an embodiment 1000 of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may, for example, comprise one or more client computing devices and/or one or more server computing device. By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 4 and 9, for example, and in the text associated with the foregoing figure(s) of the present patent application.

Referring now to FIG. 10, in an embodiment, first and third devices 1002 and 1006 may be capable of rendering a graphical user interface (GUI) for a network device and/or a computing device, for example, so that a user-operator may engage in system use. Device 1004 may potentially serve a similar function in this illustration. Likewise, in FIG. 10, computing device 1002 ('first device' in figure) may interface with computing device 1004 ('second device' in figure), which may, for example, also comprise features of a client computing device and/or a server computing device, in an embodiment. Processor (e.g., processing device) 1020 and memory 1022, which may comprise primary memory 1024 and secondary memory 1026, may communicate by way of a communication bus 1015, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 10, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 10, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a computer-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising: a general-purpose processor, comprising:
an instruction decode unit; and
an instruction execution unit including a general-purpose arithmetic unit and a second arithmetic unit dedicated to finite field operations to execute, at least in part, instructions obtained from the instruction decode unit, wherein the second arithmetic unit comprises:
a plurality of basic units;
a configuration register to store a specified parameter indicative of a polynomial representative at least in part of one or more finite fields; and
a programmable fabric to selectively interconnect a subset of the plurality of basic units to process one or more additional sets of parameters representative of one or more finite fields in accordance with one or more specified arithmetic operations indicated by one or more particular executable instructions obtained from the instruction decode unit and in accordance with the specified parameter indicative of the polynomial representative at least in part of the one or more finite fields.

2. The apparatus of claim 1, wherein the one or more finite fields to comprise one or more Galois fields.

3. The apparatus of claim 1, wherein the polynomial comprises an irreducible polynomial, and wherein the selectively interconnected subset of the plurality of basic units to process the one or more additional sets of parameters representative of the one or more finite fields at least in part according to the one or more specified arithmetic operations, at least in part according to the specified parameter indicative of the irreducible polynomial, and at least in part in accordance with a parameter representative of a specified bit-width.

4. The apparatus of claim 3, wherein the configuration register is further to store the parameter representative of the specified bit-width.

5. The apparatus of claim 4, wherein the plurality of basic units comprising a plurality of multiplication units or a plurality of squaring units, or a combination thereof.

6. The apparatus of claim 5, wherein the programmable fabric is further to selectively interconnect the subset of the plurality of basic units, including the plurality of multiplication units or the plurality of squaring units, or the combination thereof, at least in part in accordance with the parameter representative of the specified bit-width or the specified parameter indicative of the polynomial, or a combination thereof.

7. The apparatus of claim 6, wherein the one or more particular instructions comprise one or more single instruction, multiple data (SIMD) instructions, or one or more relatively wide bit-width instructions, or a combination thereof.

8. The apparatus of claim 6, wherein the one or more specified arithmetic operations to comprise one or more multiplicative inverse operations, one or more multiplication operations, one or more partial-product operations, or one or more power operations, or a combination thereof.

9. The apparatus of claim 8, wherein the programmable fabric to selectively interconnect one or more of the plurality of squaring units to perform, at least in part, the one or more power operations.

10. The apparatus of claim 8, wherein the programmable fabric to selectively interconnect one or more of the multiplication units to perform, at least in part, the one or more multiplication operations, or the one or more partial product operations, or a combination thereof.

11. The apparatus of claim 8, wherein the programmable fabric to selectively interconnect one or more of the multiplication units and one or more of the squaring units to perform, at least in part, the one or more multiplicative inverse operations.

12. A method, comprising:

executing, via an instruction execution unit including a general-purpose arithmetic unit and a second arithmetic unit dedicated to finite field operations, one or more particular instructions obtained from an instruction decode unit including configuring control logic of the second arithmetic unit to selectively interconnect a subset of a plurality of basic units of the second arithmetic unit based, at least in part, on the one or more particular instructions obtained from the instruction decode unit, wherein the executing includes storing a specified parameter indicative of a polynomial representative at least in part of one or more finite fields in a configuration register of the second arithmetic unit and further includes to processing one or more additional sets of parameters representative of the one or more finite fields via the selectively interconnected subset of the plurality of basic units at least in part according to one or more specified arithmetic operations indicated by the one or more particular instructions and at least in part according to the specified parameter indicative of the polynomial representative at least in part of the one or more finite fields.

13. The method of claim 12, wherein the one or more finite fields comprise one or more Galois fields.

14. The method of claim 12, wherein the plurality of basic units comprises a plurality of multiplication units or a plurality of squaring units, or a combination thereof.

15. The method of claim 14, wherein the control logic to selectively interconnect the plurality of multiplication units or the plurality of squaring units, or the combination thereof, at least in part in accordance with the specified parameter indicative of the polynomial representative at least in part of the one or more finite fields.

16. The method of claim 15, wherein the one or more particular instructions comprise one or more single instruction multiple data (SIMD) instructions or one or more relatively wide bit-width instructions, or a combination thereof.

17. The method of claim 16, wherein the one or more specified arithmetic operations comprise one or more multiplicative inverse operations, one or more multiplication operations, one or more partial-product operations or one or more power operations, or a combination thereof.

18. The method of claim 12, wherein the polynomial comprises an irreducible polynomial, and wherein the selectively interconnected subset of the plurality of basic units of the arithmetic unit to process the one or more additional sets of parameters representative of the one or more finite fields at least in part according to the one or more specified arithmetic operations, at least in part according to the irreducible polynomial, and at least in part according to a parameter representative of a specified bit-width.

19. The method of claim 18, further comprising storing the irreducible polynomial and the parameter representative of the specified bit-width in the configuration register of the second arithmetic unit.

* * * * *